United States Patent Office 3,103,308
Patented Sept. 10, 1963

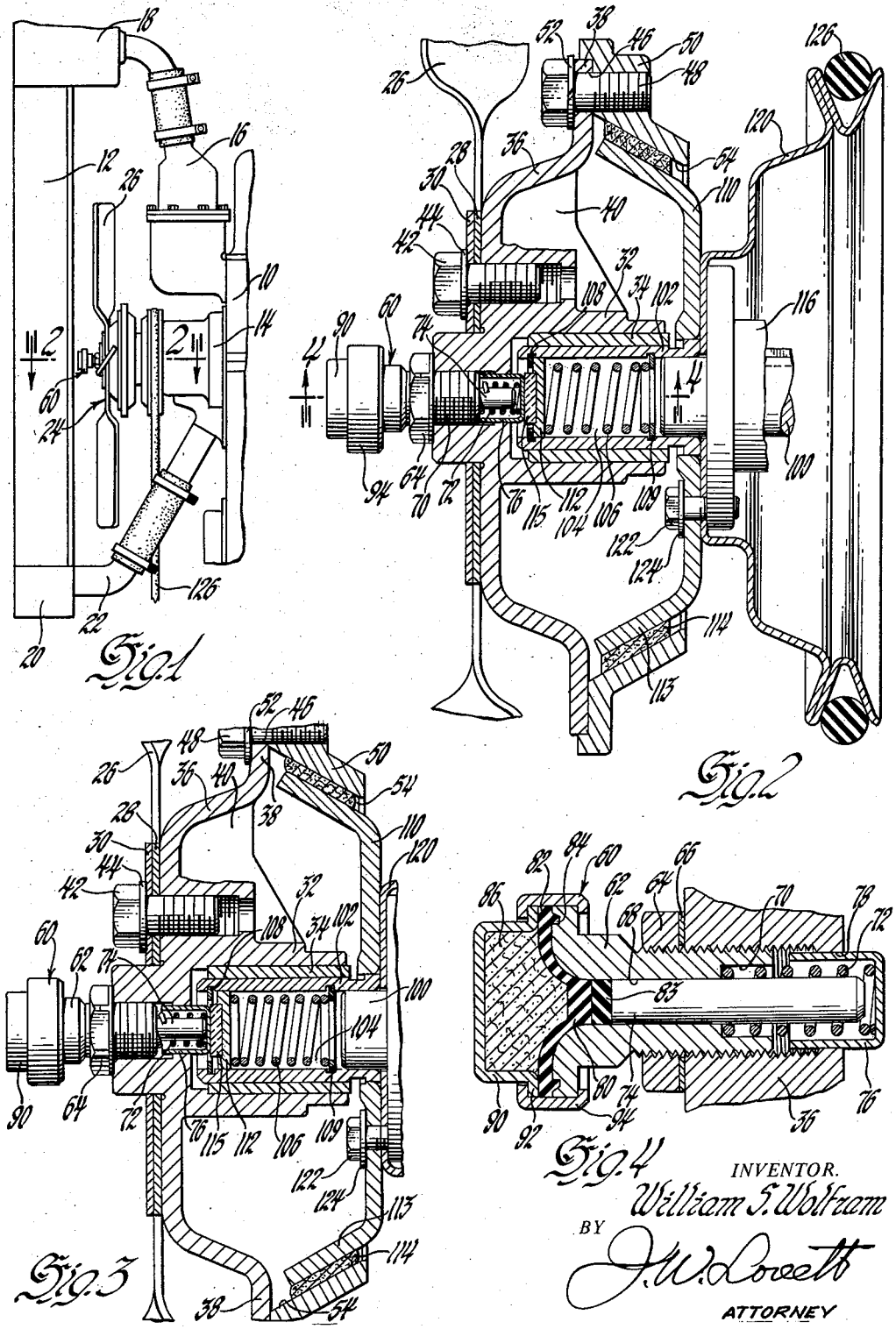

3,103,308
DRIVES FOR VEHICLE ENGINE COOLING FANS
William S. Wolfram, Birmingham, Mich., assignor to General Motors Corporation, Detroit, Mich., a corporation of Delaware
Filed July 11, 1958, Ser. No. 748,059
13 Claims. (Cl. 230—270)

This invention relates to fan drives and more particularly to drives adapted to be attached to vehicle engine shafts for operating engine cooling fans.

It is obviously desirable, in the case of an automotive vehicle, for the engine cooling fan efficiently to operate at times of high engine temperature. During hot weather the fan should operate at high speed to perform its function; but often, such as when the engine is cold, little or no operation of the fan is necessary and any expenditure of power in driving the same is wasteful. In some climates the ambient air temperature is commonly so low that a fan is not necessary for six or more months of the year. Generally at high vehicle speeds and in most localities the air passes through the engine radiator in such volume that its cooling effect on the engine coolant is adequate without a fan. With the elimination of all unnecessary fan operation it is clear that a considerable saving of engine power may be realized and also that a much more quiet operation of the vehicle may be possible.

One object of the present invention is to provide an improved fan drive of simple and rugged construction which will be driven as required by temperature conditions. Another object is to provide a fan drive which is effective to an increasing or decreasing degree dependent upon the increase or decrease of engine coolant or ambient air temperature.

One feature of the present invention comprises a tickler spring means effecting a minimum frictional drive torque between driver means connected to an engine shaft and a fan for cooling an engine. Another feature pertains to a thermostatic motor of the pellet type effectively arranged to apply the loading of a main spring for the purpose of more positively driving a vehicle engine fan as the temperature of the engine coolant or ambient air increases.

The above and other important features of the invention will now be described in detail in the specification and then pointed out more particularly in the appended claims.

In the drawings:

FIG. 1 is a side view of a vehicle radiator and fan with a portion of the engine, the drive means for the fan being shown as an embodiment of the present invention;

FIG. 2 is a sectional view looking in the direction of the arrows 2—2 in FIG. 1 and drawn to an enlarged scale, the parts being as positioned when a minimum or no cooling effect is desired;

FIG. 3 is a view similar to that of FIG. 2 but with the parts as positioned for greater cooling effect; and FIG. 4 is a sectional view looking in the direction of the arrows 4—4 in FIG. 2 and drawn to a still larger scale to illustrate the construction of a thermosensitive pellet type motor incorporated as an actuating part of the fan drive.

In FIG. 1 of the drawings, a vehicle engine 10 is illustrated as served by a conventional radiator 12 and a water pump 14. The usual conduit means 16 is provided connecting the upper portion of the engine water jacket to the top tank 18 of the radiator. The bottom tank 20 of the radiator is also connected by conventional conduits 22 to the pump 14. The interior structure of the pump is not illustrated in the drawings as the details thereof form no part of the present invention. A fan is generally indicated at 24 and is located between the radiator 12 and the engine 10. This fan bears several blades 26 radially emanating from a central disk portion 28. This disc portion is strengthened by a reinforcing ring 30 superimposed upon the disc 28. The fan also includes a hub 32 which is centrally recessed to carry a bushing 34. The hub 32 is integral with an annulus 36 bearing a radial flange 38. A number of ribs, such as the rib 40, is used to strengthen the hub structure. Each rib 40 extends from the hub 32 to the annular portion 36 immediately within the flange 38. A number of bolts, such as the bolt 42, is utilized to hold the disc 30 and the central fan plate 28 to the annulus 36. A washer 44 is used between the head of each bolt 42 and the disc portion 28. The radial flange 38 bears a number of apertures 46 and through each of these is passed a bolt 48 to hold the annulus 36 into tight engagement with a rear annulus 50. A washer 52 is employed with each bolt 48. The two annuli 36 and 50, as well as the hub 32 and the bushing 34, rotate together as part of the fan. The rear annulus 50 is formed with a frusto-conical surface 54 at its inner periphery. This surface is so arranged that its diameter decreases or diminishes in the direction of the water pump 14.

Coaxially mounted on the fan with respect to the hub 32 is a thermosensitive pellet type motor generally indicated at 60. A pellet motor of very similar construction is disclosed in the United States Patent 2,815,916, granted December 10, 1957, in the names of J. R. Holmes, H. A. Reynolds and A. Schwarz. The present motor comprises a body 62 which is threaded at one end for attachment with the annulus 36 as shown in the drawings. The attachment is made secure with the aid of a lock nut 64 and a washer 66. The body 62 bears a central bore 68 which is enlarged as at 70 for the reception of one end of a tickler spring 72. The bore 68 accommodates an elongated cylindrical pin 74 which is slidable therein and which extends from the enlarged bore 70 into a cup 76. The latter is slidable in a bore 78 formed in the annulus 36 and is of sufficient size to permit freedom of movement of the coils forming the tickler spring 72. A small portion of the bore 68 accommodates a central cylindrical portion 80 of a rubber diaphragm 82 and a nylon disc cushion 83. The latter bears an annular rib 84 which extends into an annular recess at one end of the body 62. A thermosensitive material 86, such as a crystalline wax, is retained within a cup 90 filling the latter and extending into intimate contact with one side of the diaphragm 82. The cup 90 is provided with an annular flange 92 and the latter is held to the body 62 by a clamp ring 94 and a tight seal is formed with the help of the periphery of the diaphragm 82. The term "pin means" as utilized in this specification refers to the cup 76 and the rod or pin 74 as well as the cushion 83 and the portion 80, these being the parts which are actuated with relation to the fan by expansion of the thermosensitive material 86.

A shaft of the engine, which in the present case is a shaft 100 of the engine coolant pump 14, is utilized as a support for a fan drive means, the latter comprising a hollow hub 102 in the cavity 104 of which is housed a main spring 106. Spaced axially within the cavity 104 and retained within annular grooves of the hub are two snap rings 108 and 109. Axially slidable within the cavity 104 is a disc 112 to which is affixed a central thrust plate 115. The latter is of such diameter that it is free to enter the aperture in the snap ring 108 as shown in FIG. 1. One end of the main spring 106 abuts the disc 112 urging it toward or against the snap ring 108. The other end of the spring 106 abouts the snap ring 109. Firmly affixed to one end of the hollow hub 102 is a clutch disc 110. The latter bears a frusto-conical portion 113 and between the latter and the surface 54 is located a band of friction material 114 which is rigidly affixed to the portion 113.

A flange member 116 is keyed to the water pump shaft 100 and between the clutch disc 110 and the flange 116 is interposed the center portion of a belt drive pulley 120. Bolts, such as the bolt 122, are utilized with help of washers, such as the washer 124, to hold the clutch disc 110, the pulley 120 and the flange 116 together as a unit for rotation with the shaft 100. The pulley 120 is adapted to be driven by a belt 126 which extends to a pulley on the engine crankshaft.

In the operation of the present fan drive, if it be assumed that the engine 10 is cold, the ambient air entering and passing through the core of the radiator 12 will cause a contraction or reduction in volume of the thermosensitive material 86 with the result that the spring 106 will urge the cup 76 and the pin 74 to the left until the disc 112 is stopped by the snap ring 108 as viewed in FIG. 2 of the drawings. The tickler spring 72 will always be of such light loading as continuously to urge the cup 76 into contact with the thrust plate 115. When the engine is cold the pin 74 may or may not break contact with the cup 76. Under these conditions the friction material 114 will be compressed lightly between the surface 54 and the frusto-conical portion 113 of the drive means. This light compression will be adequate to give a minimum torque. It will also give rise to considerable slippage with an increase in engine speed; i.e., the tickler spring 72 is of such a loading that it will permit the fan to run at a slow speed when the engine is cold and operated at low or high speed. The slow speed range without slippage can be set between 400 and 1200 r.p.m. depending on the specific requirements of the particular vehicle. At engine speeds above this selected range or value the clutch arrangement will slip when the mechanism is cold. To state the matter in another way, the pressure on the friction material 114, when the engine is cold and due to the tickler spring 72, is such as to give positive driving of the fan only up to the predetermined engine limit speed.

Assuming that the engine temperature is high, then the ambient air, as it emanates from the core of the radiator 12, will be at a high temperature; and, as a result, the pellet motor 60 will maintain a torque drive proportionate to the loading of the large or main spring 106. This is because the thermosensitive material 86 will expand under elevated temperature conditions and cause the pin means to move to the right, as viewed in the drawings, into position such as illustrated in FIG. 3. In this case, the disc 112 will move away from the retaining ring 108 and increase the loading of the main spring 106. This loadng is effective in linearly moving the fan means and increasing the compression exerted on the friction material 114 to give a high range limiting speed of the fan. This high range limiting speed can be set between 2000 and 4000 r.p.m. depending on the requirements of the particular vehicle and the selection of a particular spring. When the ambient air temperature is high, the fan drive will be positive up to the high range limiting the speed and slippage will occur above that speed.

Slippage at the interface between the lining 114 and the surface 54 during high vehicle speed is a normal situation as generally at such speed the volume of air supplied is such that adequate cooling is provided without the aid of the fan.

The motor plunger or pin 74 in one given installation has a maximum movement of 100 thousandths of an inch as the wax 86 changes from a solid to a liquid state or vice versa. When the power movement takes place, the loading of the main spring 106 applies while the load on the tickler spring decreases. When less fan operation is desired, the spring 106 becomes of no effect as the disc 112 is stopped by the snap ring 108 and then the tickler spring 72 performs its function.

The thrust of the fan under any conditions changes its speed slightly but to a negligible amount at low engine speeds. If the vehicle engine is driven in the high speed range, the thrust becomes an appreciable amount and adds to the force supplied by the main spring to provide the necessary load to drive the fan.

From the above, it may be seen that the fan drive is so arranged as to provide fan actuation when cooling is desriable and to minimize power requirements for the fan and sound effects occasioned by the latter when cooling is not required.

I claim:

1. A fan drive comprising coaxial drive means, fan and thermosensitive motor, said drive means having a frusto-conical periphery and a hollow hub attachable to the end of a shaft, said fan being rotatable and linearly movable on said hub and bearing a frusto-conical surface, said frusto-conical surface on said fan being disposed outwardly from said frusto-conical periphery of said drive means and cooperating with said frusto-conical periphery of said drive means to retain said fan on said hub, the said motor being fixed to said fan and operatively exposed to the ambient air, pin means including a tickler spring and extending from said motor into contact with said drive means, friction material interposed between said periphery and said surface, and the arrangement being such that the force of said tickler spring effects a power transmission pressure on said friction material, when said thermosensitive motor is cold.

2. A fan drive comprising coaxial drive means, fan and thermosensitive motor, said drive means having a frusto-conical periphery and a hollow hub attachable to the end of a shaft, said fan bearing a frusto-conical surface facing said periphery and being rotatable and axially movable with respect to said hub, said frusto-conical surface of said fan being disposed outwardly from said frusto-conical periphery on said drive means and cooperating with said frusto-conical periphery of said drive means to limit the permissible axial motion of said fan with respect to said hub whereby said fan is retained in assembled relation on said hub, friction material interposed between said periphery and said surface, the said motor having a thermosensitive portion exposed to the ambient air and pin means including a tickler spring extending from said portion and toward the cavity within said hollow hub, main spring means within said cavity, and the arrangement being such that a rise in temperature of said air actuates said pin means to relieve said tickler spring of its loading and subsequently to apply the loading of said main spring means to effect an increase in power transmission pressure on said friction material.

3. A fan drive comprising drive means coaxial with an axially aligned fan and thermosensitive motor, annular peripheral portions of said drive means and fan being in frictional contact for power transmission purposes, a hollow hub forming a part of said drive means and adapted to be driven by a shaft, the annular peripheral portion of said fan and the annular peripheral portion of said drive means cooperating with each other to retain said fan in assembled relationship on said hub, a main spring having one end in fixed abutment with said hub, said fan being rotatable on said hub, a tickler coil spring in axial alignment with said hub and main spring, said motor having a thermosensitive portion exposed to ambient air and fixed to said fan, a pin linearly actuatable by said motor as a part thereof and extending through the coils of said tickler spring, the latter exerting a compressive force at low ambient air temperature between said fan and said drive means, said pin being adapted at high ambient air temperature to apply the loading of said main spring, and the arrangement being such that said tickler spring effects a relatively light frictional contact for driving said fan and said main spring is adapted to effect a heavier frictional contact for driving said fan.

4. In a fan drive arrangement for internal combustion engines, a rotatable shaft, means for rotating said shaft, a clutch member fixed to said shaft for rotation therewith, a hollow support member carried by said shaft and coaxial therewith, a fan hub having fan blades thereon, a second clutch member carried by said fan hub, means supporting said fan hub on said hollow support member for both rotary and axial motion with respect to said hollow support member, said clutch members cooperating with each other to retain said fan hub on said hollow support member, a disc disposed in said hollow support member for axial motion with respect to said support member, a stop member for limiting the range of movement of said disc in one direction, spring means yieldably biasing disc against said stop member, a temperature responsive power element having an outer body fixed to said fan blade hub and an axially movable plunger, a relatively lightweight spring, said last-mentioned spring being disposed between said disc and said outer body of said temperature responsive power element for yieldably biasing said fan hub axially to lightly engage said clutch members, said power element plunger being movable axially at elevated temperatures of said power element to move said fan hub axially to engage said clutch members with greater force than that of said lightweight spring, said disc member being movable against said first-mentioned spring at elevated temperatures of said power element to compress said first-mentioned spring to thereby limit the load applied to said clutch members.

5. A fan drive assembly comprising a power driven power input shaft, a first clutch member fixed to said shaft for rotation therewith, a hollow sleeve fixed to said shaft and extending axially outwardly from one end of said shaft, a fan hub supported for rotational and axial movement on said sleeve, a second clutch member carried by said fan hub, fan blades fixed to said fan hub, said clutch members cooperating with each other to retain said fan hub on said sleeve, an axially movable reaction member disposed in said sleeve, a stop member disposed in said sleeve for limiting the range of movement of said reaction member in one direction, a relatively heavy weight spring yieldably biasing said reaction member against said stop member, a bore in said fan hub coaxial with said sleeve, a temperature responsive power element having an outer body disposed in said bore and secured to said fan hub, said power element having an axially movable plunger extending into said bore, a cup member disposed in said bore and axially movable with respect to said bore, a relatively lightweight spring having one end seated upon said cup member and another end seated upon the outer body of said power element and disposed in said bore, said lightweight spring being normally effective to bias said cup member into contact with said reaction member and to bias said fan hub axially with respect to said sleeve to partially engage said clutch members for slow speed fan drive, said plunger being effective upon a rise in temperature of said power element to apply additional force to said cup member for completing engagement of said clutch members for relatively high fan speed drive, said reaction member being movable against said relatively heavyweight spring in response to force applied thereto by said plunger to limit the force applied to said fan hub by said power element.

6. A fan drive assembly comprising a power driven power input shaft, a cone clutch member fixed to said shaft for rotation therewith, a hollow sleeve fixed to said shaft, a fan hub supported for rotation on said sleeve and axially movable on said sleeve, a cone clutch member carried by said fan hub and overlying said fist-mentioned cone clutch member to retain said fan hub in assembled relation on said hollow sleeve, fan blades supported on said fan hub, a thrust plate disposed within said hollow sleeve and axially movable with respect to said sleeve, stop means within said sleeve for limiting the permissible range of motion of said thrust plate in one direction, a spring disposed within said sleeve normally biasing said thrust plate against said stop means, a central axial bore in said fan hub, a cup disposed within said bore and contacting said thrust plate, a temperature responsive power element having a body portion fixed to said fan hub and a movable plunger extending into said cup, a second spring disposed in said bore normally urging said fan hub axially on said hollow sleeve to partially engage said cone clutch member for slow speed drive of said fan at reduced temperatures of said power element, said power element plunger being movable axially in response to rise in temperature of said power element to force said cup against said thrust plate with increased force to complete the engagement of said cone clutch member for relatively high speed fan drive, said thrust plate being axially movable against said first-mentioned spring in response to a predetermined force applied thereto by said plunger to limit the force applied to said fan hub by said power element.

7. A fan drive assembly comprising, an engine driven drive shaft, a fan hub, a conical clutch member fixed to said drive shaft for rotation therewith, a conical clutch member carried by said fan hub for rotation therewith, said first-mentioned clutch member, said second-mentioned clutch member, and said fan hub enclosing a chamber therebetween; a hollow sleeve carried by said drive shaft and extending axially across said chamber, a bushing on said sleeve, a boss on said fan hub extending axially across said chamber for supporting said fan hub for rotary and axial motion on said bushing, said second-mentioned clutch member being disposed to provide an inner surface adapted to contact an outer surface of said first-mentioned clutch member to retain said fan hub in assembled relationship on said bushing, a movable reaction member disposed within said sleeve, a stop member for limiting the permissible range of motion of said reaction member in one direction, a relatively heavy weight spring disposed within said sleeve acting on said reaction member and normally effective to seat said reaction member on said stop member, a central bore in said fan hub, a temperature responsive power element having an outer body secured in said bore and a movable plunger extending into said bore, a cup member in said bore and axially movable in said bore, a relatively lightweight coil spring in said bore supported upon said plunger, said last-mentioned spring being effective to bias said cup member against said reaction member and to move said clutch hub axially to partially engage said cone clutch members for relatively slow speed drive of said clutch hub, said plunger being axially movable in response to rise in temperature of said power element to apply increased force to said reaction member to fully engage said cone clutch members for relatively high speed fan drive, said reaction member being movable against said relatively heavy weight spring upon further axial movement of said plunger after said cone clutch members are fully engaged.

8. In combination, a driving unit comprising a shaft, means to rotate said shaft, a rearwardly tapered conical driving drum connected to rotate with said shaft, a driven unit comprising a cage member having a front face and a circumferential part in spaced concentric relation with said driving drum, said drum and said circumferential part having opposed complementary surfaces, friction material carried by one of said surfaces and frictionally engaging the other of said surfaces, a fan carried by said cage member and having the plane thereof at right angles to the axes of said conical drum and friction material, the resultant thrust of said fan acting in opposite direction to the direction of taper of said conical drum, spring means between said driving unit and said driven unit for urging said friction material into engagement with said other surface, and a thermally expansible device carried by said front face and having a movable element in operative relation with said driving unit, whereby, when said device becomes heated, the movable element thereof will engage said driving unit to augment the forces of said fan thrust and said spring to more tightly engage said friction material with said other surface and whereby said driving drum is the support for said driven unit.

9. In combination, a driving unit including a conical driving drum having a rearwardly tapered surface, and a driven unit comprising a cage member having an annular portion surrounding said driving drum, said annular portion having a complementary surface in spaced concentric relation with said driving drum, friction material carried by one of said surfaces and engaging the other of said surfaces, spring means urging said friction material into engagement with said other surface, fan means on said cage member producing a thrust when rotated to further urge said friction material into engagement with said driving drum, and thermally expansible means operatively connected between said driving unit and said driven unit for further urging said friction material into engagement with said driving drum when said thermally responsive means becomes heated.

10. In combination, a driving unit comprising a rearwardly tapered conical driving drum, and a driven unit comprising a cage member having a front face and a circumferential part in spaced concentric relation with said driving drum, friction material having a conical surface disposed in the space between said rearwardly tapered driving drum and said circumferential part of said driven unit, spring means urging said driven unit to a position wherein said friction material is engaged between said driving drum and said circumferential part of said driven unit, fan means on said driven unit producing a thrust when rotated further engaging said friction material, and a thermally expansible means operatively connected between said driving unit and said driven unit for further engaging said friction material when said thermally responsive means becomes heated.

11. In combination, a driving unit comprising a shaft, means to rotate said shaft, and a rearwardly tapered conical driving drum connected to rotate with said shaft, and a driven unit comprising a cage member having a portion thereof disposed in spaced concentric relation with said driving drum, friction material disposed between said rearwardly tapered conical driving drum and said concentric portion of said cage member, said friction material having a conical surface that is complementary with said driving drum and in engagement therewith, a fan carried by said cage member and having the plane thereof at right angles to the axes of said conical drum and friction material, said fan when rotated producing a thrust acting in opposite direction to the direction of taper of said conical drum and friction material, spring means between said driving unit and said driven unit and urging said driven unit to a position wherein said friction material is engaged between said conical driving drum and said concentric portion of said cage member, and a thermally expansible device carried by said cage member and having a movable element in operative relation with said driven unit, whereby when said device becomes heated the movable element thereof will engage said driving unit to augment the forces of said fan thrust and said spring to more tightly engage said friction material between said driving drum and said concentric portion of said cage member.

12. In combination, a driving unit comprising a shaft, means to rotate said shaft, and a rearwardly tapered conical driving drum connected to rotate with said shaft, and a driven unit comprising a cage member having a front face and a circumferential part in spaced concentric relation with said driving drum, friction material disposed between said conical driving drum and the circumferential part of said driven unit, said friction material having a conical surface that is complementary with said conical driving drum, a fan carried by said cage member and having the plane thereof at right angles to the axes of said conical drum and friction material, said fan when rotated producing a thrust acting in opposite direction to the direction of taper of said conical drum and friction material, spring means between said driving unit and driven unit urging said driven unit to a position wherein said friction material is engaged between said driving drum and said circumferential part of said driven unit, and a thermally expansible device carried by said front face and having a movable element in operative relation with said driving unit, whereby when said device becomes heated the movable element thereof will engage said driving unit to augment the forces of fan thrust and said spring to more tightly engage said friction material between said rearwardly tapered driving drum and the circumferential part of said cage member.

13. In combination, a driving unit comprising a shaft, a pulley fixed to said shaft to rotate it, and a rearwardly tapered conical driving drum connected to rotate with said shaft, and a driven unit comprising a cage member having a front face and a circumferential part in spaced concentric relation with said driving drum, friction material disposed between said circumferential part and said rearwardly tapered conical driving drum, said friction material having a conical surface that is complementary to said conical driving drum and in engagement therewith, a fan carried by said cage member and having the plane thereof at right angles to the axis of said conical drum and friction material, said fan when rotated producing a thrust acting in opposite direction to the direction of taper of said conical drum and friction material, a reaction member carried by said driving drum opposite said front face of said cage member, a spring between said reaction member and said cage member and urging said cage member to a position wherein torque is transmitted from said driving drum to said driven unit through said friction material, and a thermally expansible device carried by said front face and having a movable element in operative relation with said reaction member, whereby when said device becomes heated the movable element thereof will engage said reaction member to augment the forces of said fan thrust and said spring to more tightly engage said friction material.

References Cited in the file of this patent

UNITED STATES PATENTS

| | | |
|---|---|---|
| 1,233,518 | Snyder | July 17, 1917 |
| 1,482,498 | Wills | Feb. 5, 1924 |
| 2,005,468 | Modine | June 18, 1935 |
| 2,658,400 | Dodge | Nov. 10, 1953 |
| 2,819,703 | Suttle | Jan. 14, 1958 |
| 2,838,244 | Oldberg | June 10, 1958 |
| 2,840,315 | Heiss | June 24, 1958 |
| 2,840,316 | Herbenar | June 24, 1958 |
| 2,877,751 | Johnston | Mar. 17, 1959 |